Patented May 27, 1930

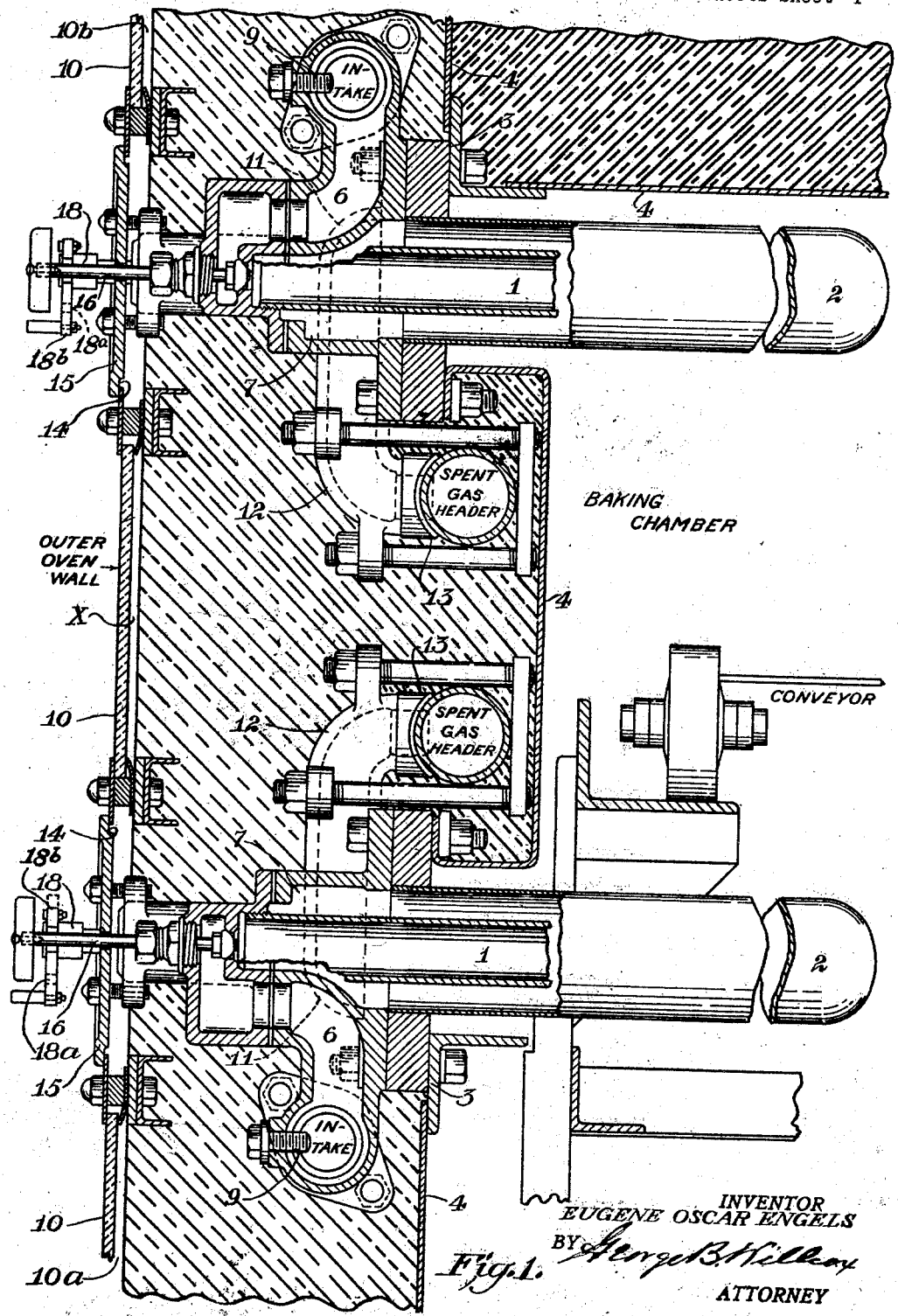

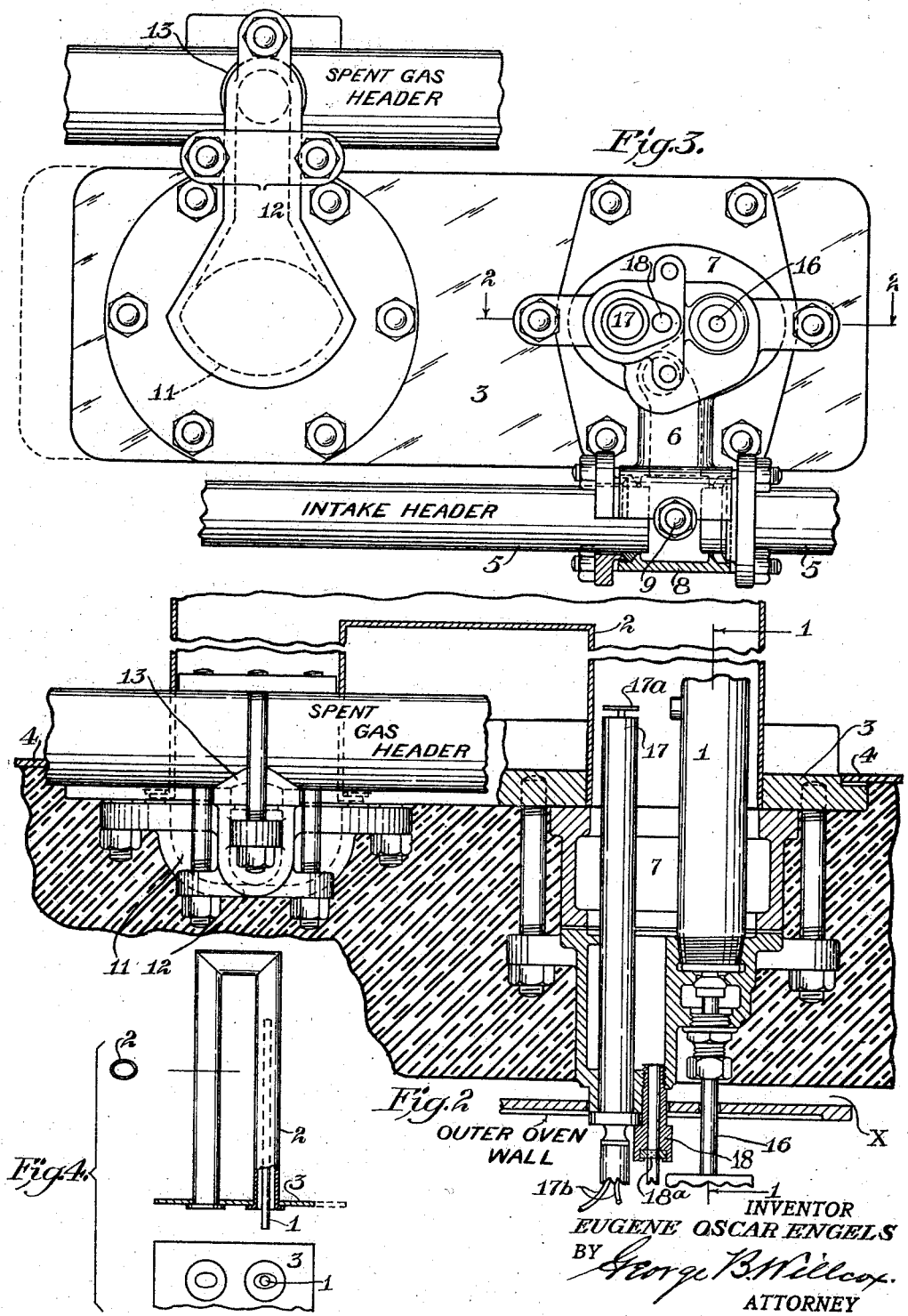

1,760,486

UNITED STATES PATENT OFFICE

EUGENE OSCAR ENGELS, OF SAGINAW, MICHIGAN, ASSIGNOR TO BAKER PERKINS COMPANY, INC., OF SAGINAW, MICHIGAN, A CORPORATION OF NEW YORK

FUEL SYSTEM FOR INCLOSED-BURNER BAKE OVENS

Application filed November 8, 1928. Serial No. 317,943.

This invention relates to bake ovens of the type that comprises an outer box-like or tunnel-like shell supported by a suitable framework, and a baking chamber inclosed therein, the side wall of the baking chamber being in spaced relation to the outer wall of the oven. The baking chamber is heated by inclosed burners utilizing as fuel a combustible mixture of air and natural or manufactured gas, or of air and oil vapor.

My improved inclosed-type burner as applied in this invention possesses several important advantages over the open flame burners. Neither its flame nor the products of combustion can contact with the loaf-conditioning steam; less steam is required to maintain a satisfactorily wet atmosphere and the burner flame is unaffected by steam and vapors released from the loaves being baked. Economical flames can be maintained throughout all heated zones of the oven and no soot or undesirable gases can get into the oven from the burners, regardless of variations in the quality of the oven atmosphere.

This invention provides extreme flexibility for variety baking because of the ease with which its heat zones and burner distributions can be adjusted, altered and adapted to various requirements of operation.

In its more specific aspects the present improvements pertain to the mounting of the burners, and the arrangement, construction and mode of operation of the burner jackets, the fuel supply headers, the spent gas or exhaust headers, the means for delivering gas-air mixture to the burner and means for igniting, regulating and inspecting the flame, and means for conducting away the spent gases.

The inventive ideas are embodied in gas-control and preheating devices concealed within the wall structure of the oven and so arranged as to prevent heat conduction from the baking chamber to points outside the oven. The outside walls are, therefore, smooth, unobstructed by fittings and in appearance most attractive.

With the foregoing and certain other objects in view, which will appear later in the specification, my invention comprises the devices described and claimed and the equivalents thereof.

In the drawings Fig. 1 is a part sectional view on the line 1—1 of Fig. 2 of a portion of the oven wall and a portion of the top or crown of the oven, showing two heating elements and their relation to the claimed features of the invention.

Fig. 2 is a fragmentary plan view, partly in horizontal section, of the parts shown in Fig. 1, the sectional part taken on line 2—2 of Fig. 3, the intake header being removed.

Fig. 3 is a front view of the adjustable slidable panel for the baking chamber wall, showing the relative locations of the intake housing, the spent gas exhaust housing and the connections to the intake and exhaust headers.

Fig. 4 is a diagrammatic detail view, partly in section, of the panel, burner and burner jacket arrangement.

In the embodiment of my invention shown herein, the tubular gas burner 1 is received in an outer tubular jacket 2 of substantially U-form, its ends disposed side by side, constituting the so-called indirect-heat arrangement. Both ends of the U-shaped burner jacket terminate at an apertured plate or panel 3 adapted to be applied as an integral part of the baking chamber wall 4 or to be detached therefrom and shifted to a different place along the wall as indicated in dotted lines in Figs. 3 and 4, in order to bring about changes in the heat distribution by rearranging the burners. This novel burner enclosure and apertured panel arrangement enables the entire combustion system to be cleaned easily and quickly. Its arrangement is such that even if an explosive flash-back should occur within the jacket in the limited space around the burners it can do no damage, because of the relatively small volume of gas involved.

The fuel supply or intake header is in this invention preferably built up of individual lengths or sections 5 of pipe arranged end-to-end. It is disposed adjacent the wall 4 of the baking chamber and is heated therefrom.

The means for supplying fuel from the intake header to the burner 1 is a gas-air conduit 6. This conduit is preferably cast integral with a fuel intake housing 7 on the shiftable panel 3 of the baking chamber wall.

An end of the gas-air intake conduit is shaped to fit around and releasably embrace the intake header, and is shiftable to any desired location along the length of the header. For that purpose a packing gland 8 is preferably employed constituting a connecting fitting between the end-to-end sections 5 of the intake header. The gland is provided with means for keeping the ends of the two tubes separated, preferably a bolt 9 that projects radially into the cylindrical barrel of the gland and forms a stop between the ends of the tubes so they can not be shoved close enough together to throttle the gas on its way from the intake header to the burner.

The exhaust or spent gas header likewise is disposed in the space between the outer wall of the oven and the wall of the baking chamber and lies adjacent the latter, so as to utilize otherwise waste heat for reducing radiation losses from the chamber, and improving the fuel economy of the oven by preheating the gas-air fuel mixture just before it reaches the burners and also preventing harmful expansion and contraction of the exterior paneling 10 which is commonly made of glass, tile or other brittle material.

Spent gases from the burner jacket pass through an outlet or exhaust housing, in the form of a hollow casting 11, which is attached to the panel 3 alongside the fuel intake housing 7. This housing 11 communicates with a conduit 12 that connects with the spent gas exhaust header. An end 13 of this spent-gas conduit 12 is shaped to fit and releasably embrace the spent gas header at any desired location along the length of the header. The intake and spent gas headers extend in the same direction, preferably parallel. The intake housing 7 and the exhaust outlet housing 11 can be used in the positions shown in the drawings, or they may be inverted, depending upon whether the corresponding header is above or below the panel 3.

The paneled outer wall of the oven is formed with an aperture 14 opposite the shiftable panel 3, and the aperture is normally closed by a plate 15 through which project the regulating, ignition and flame-inspection devices, namely the stem 16 of the fuel valve that controls the rate of flow of fuel gas from the intake header to the burner, the end of the usual electric ignition device 17, and the customary inspection eye-piece 18.

The ignition device is of usual form, generally consisting of a tubular spark plug with spark points 17$^a$ at its inner end and wiring terminals 17$^b$ at its outer end.

The burner inspection device consists of a tube 18 directed into the burner jacket and having at its outer end a glass cover 18$^a$ for the protection of the observer's eye. The glass 18$^a$ is mounted in a vertical slide 18$^b$ by which the glass can be put into or out of register with the end of the tube.

A wall of heat-insulating material such as blocks or slabs of magnesia or asbestos is built up between the outer oven wall and the wall of the baking chamber. In conjunction with the concealed hot spent gas header and its conduits 12 there is provided a novel means for preventing accumulation of water of condensation within the wall of insulating material or upon the inner faces of the exterior oven wall panels 10. To that end the insulating material, with the spent gas header, its conduits 12 and housings 11 concealed therein, is spaced apart, as at X, from the outer paneling 10 and in the air duct so made a slow but constant air circulation is induced by the heat of the exhaust gases. Air enters through openings 10$^a$ at the lower margin of the wall, passes upward between the inner face of the paneling and the insulating material, taking up moisture and escaping to the atmosphere near the top of the oven wall at 10$^b$, thereby protecting panels 10 of the outer wall against cracking by heat changes.

Heretofore it has been the customary practice to place the intake headers and their associated fuel conduits to the various burners, outside the oven and they have usually been painted or enameled. In the event of explosive back-firing the paint or enamel was sometimes scorched, the oven wall was smoked and unpleasant odors developed. In my improvement these objections are overcome because the intake pipe, being hidden within the oven wall, requires no paint or enamel and consequently inadvertent back-firing in the burner can do no injury to the appearance of the oven.

The mode of operation of the invention is as follows:

Gas-air mixture from the intake header flows through the conduit 6, regulating valve and housing 7 to burner 1. Spark plug 17$^a$ lights the burner, and the gases of combustion escape from jacket 2 through apertured panel 3, spent gas housing 11, conduit 12 and the exhaust header.

The incoming fuel is preheated on its way to the burner by reason of the proximity of the intake header, its conduit and its housing, to the hot spent gas header and baking chamber wall 4.

The hot spent gases in their passage from the burner keep the baking chamber wall 4 heated to a sufficient degree to practically eliminate loss of baking heat by radiation or conduction, because of reduction of the temperature difference between inside and outside. Furthermore, the heat insulating wall is kept free from moisture, and a slight upward draft is established in wall duct X, keeping the outer paneling 10 at a uniform temperature.

Regulation of the gas flames is had by the valve handle 16 and inspection is made through the peep tube 18.

If the burners require to be shifted as indicated diagrammatically in Figs. 3 and 4, to bring about a redistribution of heat in the baking chamber or in the loaf-steaming department of the oven, the plate 15 in the outer wall is loosened and an adjacent panel removed. The panel 3 of the baking chamber wall is then loosened, the connections 8, 13 between the ends of conduits 6, 12 and the intake and exhaust headers are released, and the panel 3 together with its attached burner 1, jacket 2, and intake and exhaust housings 7, 11 can be shifted bodily to any other desired position on the baking chamber wall, in the manner set forth in my co-pending application Serial No. 312,288.

For connecting up the intake header at the new burner position pipe sections 5 are selected of lengths suited to the new distance between burners. Their ends are inserted into the packing gland 8 and against the abutment 9.

The exhaust header is apertured at a place registering with the end of the exhaust conduit 13 in its new position, and then the panel 3 and the ends of the conduits 6, 12 are secured in place, after which the heat-insulating wall is built up around the burner and panel 3, the plate 15 of the outer wall is secured in place and flanked by newly fitted outer wall panels 10, preferably applied as described in my co-pending application, Serial No. 312,289, filed October 13, 1928.

It may be repeated at this point that there is a novel mode of operation of the burners and associated parts, and a novel cooperative relationship between the indirect-heat type of burner employed in conjunction with the shiftable panel and the gas-preheating, heat-saving and wall-temperature stabilizing features of the intake and spent-gas header arrangements. The factors that make the inclosed U-type panel-mounted burner an important part of the invention as claimed may be noted.

For the purpose of this invention the inclosed-type burner herein described possesses important and novel operative advantages over the usual open flame type burner that become apparent from the following comparison:

An open flame burner located in the steam-spraying compartment of an oven requires more oxygen than one remote from the steaming zone. Hence two open flame burners can not be satisfactorily connected to the same gas-air mixer. As a further example, the blaze of an open flame burner situated just inside the unloading end of an oven encounters varying amounts of atmospheric oxygen driven in from outside and it is almost impossible to maintain a proper gas-air mixture throughout the oven, especially if the usual unit pre-mixing gas system is used. Moreover, open flame burners tend to dry out and overheat the loaf-conditioning steam in the baking chamber, requiring more steam to be added in order to maintain a saturated atmosphere, thus complicating the problems of oven heat control.

My invention as herein described avoids the difficulties associated with open burners and in addition makes it possible to produce an oven all of whose fuel gas and exhaust connections are out of sight, leaving a smooth handsomely finished tile, glazed or enameled oven wall, yet possessing all the advantages set forth in the foregoing statements of the invention.

Having thus described my invention, what I claim and desire to secure by Letters Patent is:

1. In combination, a walled oven, an independently walled baking chamber therein, a tubular gas burner having an enclosing jacket of substantially U-form, its ends disposed side-by-side, an adjustably shiftable panel normally constituting an integral part of a wall of said chamber, said panel formed with apertures in register with the ends of said jacket, for the purposes set forth.

2. In combination, a walled oven, an independently walled baking chamber therein, a tubular gas burner having an enclosing jacket of substantially U-form, its ends disposed side-by-side, an adjustably shiftable panel normally constituting an integral part of a wall of said chamber, said panel formed with apertures in register with the ends of said jacket, the outer wall of the oven formed with an aperture opposite said shiftable panel, for affording access to said panel and jacket.

3. A walled outer oven structure, a baking chamber contained therein whose side walls are in spaced relation thereto, heating elements of the inclosed burner type within the baking chamber, a fuel intake header and a spent gas exhaust header, both disposed adjacent a wall of the baking chamber, the intake header adapted to be preheated from said wall, the exhaust header adapted to impart heat thereto, and gas conduits connecting each heating element with said headers.

4. A walled outer oven structure, a baking chamber contained therein whose side walls are in spaced relation thereto, a heating element of the inclosed burner type within the baking chamber comprising a tubular jacket and a tubular burner therein, a fuel intake header disposed adjacent a wall of the baking chamber adapted to be heated from said wall, and a gas conduit connecting said burner with said header, and means for removing spent gases from said jacket, for the purposes set forth.

5. A walled outer oven structure, a baking chamber contained therein whose side walls are in spaced relation thereto, a heating element of the inclosed burner type within the baking chamber comprising a tubular jacket and a tubular burner therein, a spent gas exhaust header disposed adjacent a wall of the baking chamber adapted to impart heat thereto, a spent gas conduit connecting said jacket with said exhaust header and means for supplying fuel to said burner, for the purposes set forth.

6. In combination with the baking chamber of an oven, a fuel intake header and a spent gas header arranged parallel, a shiftable panel normally constituting an integral part of a wall of said chamber, a U-shaped heating element projecting from a face of said panel and comprising a tubular burner and an enclosing jacket, said panel carrying on its other face a fuel intake control valve, a conduit connecting the fuel intake header with said valve and a conduit connecting said burner jacket with said spent gas header, for the purposes set forth.

7. A structure as defined in claim 6 wherein the ends of the conduits are shaped to releasably embrace respectively the intake header and the exhaust header at any desired location along the length of said headers.

8. In combination with a baking chamber of an oven, a fuel supply header and a spent gas header extending in the same direction, a heating element operably associated with a panel that normally constitutes an integral part of a wall of said chamber, said panel carrying a fuel control valve and a conduit member connecting the fuel supply header with said valve and a conduit member connecting said heating element with said spent gas header, for the purposes set forth.

9. In combination with the baking chamber of an oven, a fuel supply header and a spent gas header arranged parallel, a shiftable panel normally constituting an integral part of a wall of said chamber, a burner and an enclosing jacket therefor secured to said panel, a fuel intake housing on said panel and a burner inlet control valve in said housing, a conduit integral with said housing and connecting the fuel intake header with said valve, said conduit having at its end a packing gland for said intake header, a second housing on said panel, a conduit integral with said second housing and connecting with the spent gas header, an end of said last-mentioned conduit shaped to fit and embrace the spent gas header, for the purposes set forth.

10. In an oven of the class described a panel having a heating element of the gas-fired type mounted thereon, an intake housing and a spent gas housing arranged on said panel, communicating respectively with the burner intake end and the spent gas exhaust end of said heating element, each housing adapted for inversion with respect to said panel, and intake and exhaust headers communicating respectively with said housings, for the purposes set forth.

11. A device arranged and operating as set forth in claim 10 including a header composed of a plurality of tubes arranged end-to-end, a packing gland arranged to receive ends of two adjacent tubes, said gland communicating with one of said housings, and means associated with the glad for constraining the ends of said tubes therein to spaced relationship.

12. In a bake oven having an outer wall and an inner baking chamber wall spaced apart, a removable apertured panel of said inner wall secured to an inclosed-type burner that projects from a face of said panel into the baking chamber, a fuel-intake housing and a spent-gas outlet housing also secured to the panel, both housings projecting from the face of said panel opposite said burner into the space between said walls, for the purposes set forth.

13. In a bake oven, a paneled outer oven wall, a baking chamber wall in spaced relation therewith, a wall of heat-insulating material between said outer and baking chamber walls and spaced from said outer wall, providing an air-circulating duct behind the panels thereof, and a heated spent-gas header in the space between said walls and inclosed by said insulating material, for the purposes set forth.

14. A structure as defined in claim 12 wherein the intake housing carries a fuel intake control valve, an ignition device and burner inspection device, all operable from outside the outer wall of the oven.

15. A baking chamber, a removable apertured panel of a wall thereof secured to an inclosed-type gas burning element that projects into the baking chamber, a fuel-intake housing and also a spent-gas outlet housing secured to the face of the panel opposite said burner, for the purposes set forth.

16. A walled outer oven structure, a baking chamber contained therein whose side walls are in spaced relation thereto, a fuel burner inclosed within a jacket and located within the baking chamber, a fuel intake conduit connected to said burner and an exhaust conduit connected to said jacket both of said conduits disposed in the space between said walls and located in proximity to each other for heat interchanging.

In testimony whereof, I affix my signature.
EUGENE OSCAR ENGELS.